(12) United States Patent
Edala et al.

(10) Patent No.: US 12,475,107 B2
(45) Date of Patent: Nov. 18, 2025

(54) COLONIZATION OF TRANSACTIONAL DATA BASED UPON GEOGRAPHY

(71) Applicant: Wells Fargo Bank, N.A., San Francisco, CA (US)

(72) Inventors: Narasimha Murthy Edala, Hyderabad (IN); Govinda Rajulu Nelluri, Hyderabad (IN); Udaya Ramu Peethani, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/644,710

(22) Filed: Apr. 24, 2024

(65) Prior Publication Data

US 2025/0335425 A1 Oct. 30, 2025

(51) Int. Cl.
| | | |
|---|---|---|
| *G06F 16/00* | (2019.01) | |
| *G06F 16/23* | (2019.01) | |
| *G06F 16/29* | (2019.01) | |

(52) U.S. Cl.
CPC .......... *G06F 16/2379* (2019.01); *G06F 16/29* (2019.01)

(58) Field of Classification Search
CPC .............................. G06F 16/2379; G06F 16/29
See application file for complete search history.

(56) References Cited

U.S. PATENT DOCUMENTS

| | | | |
|---|---|---|---|
| 7,149,701 B2 | 12/2006 | Mckinney | |
| 8,676,593 B2 | 3/2014 | Nagpal et al. | |
| 8,706,687 B2 | 4/2014 | Fineberg et al. | |
| 10,643,279 B2 | 5/2020 | Pessin | |
| 11,488,104 B2 | 11/2022 | Soon-Shiong | |
| 11,669,815 B1 | 6/2023 | Warner et al. | |
| 11,823,098 B2 | 11/2023 | Cella | |
| 2012/0124001 A1* | 5/2012 | Shah | G06F 16/273 707/634 |
| 2019/0080379 A1 | 3/2019 | Dallahan et al. | |
| 2019/0205993 A1* | 7/2019 | Rodriguez | H04L 67/535 |
| 2020/0380436 A1 | 12/2020 | Bonomo | |
| 2021/0326941 A1* | 10/2021 | Herath | G06F 9/451 |

FOREIGN PATENT DOCUMENTS

WO 2023099238 A1 6/2023

OTHER PUBLICATIONS

Nair, Srijit et al., "A Model to Enhance Security Of Digital Transaction," 2019 4th International Conference on Information Systems and Computer Networks (ISCON), Date of Conference: Nov. 21-22, 2019, INSPEC Accession No. 19454807, DOI: 10.1109/ISCON47742.2019.9036225, IEEE Xplore, 4 pages.

* cited by examiner

Primary Examiner — Dinku W Gebresenbet
(74) Attorney, Agent, or Firm — Merchant & Gould P.C.

(57) ABSTRACT

An example computer system for colonizing transactions can include: one or more processors; and non-transitory computer-readable storage media encoding instructions which, when executed by the one or more processors, causes the computer system to: receive a transaction initiated by an originator; automatically route the transaction to a colony based upon a context packet associated with the transaction; and store data associated with the transaction in the colony; wherein the colony satisfies regulatory requirements of a geographic area associated with the transaction.

16 Claims, 4 Drawing Sheets

COLONIZATION OF TRANSACTIONAL DATA BASED UPON GEOGRAPHY

BACKGROUND

While the tech world is being globalized, the trend of localization in the current transactional banking market (e.g., payments, trade finance, cards, markets) is increasing due to geopolitical demands. Enterprise landscapes are reconfiguring by creating replicas/roundtrips/virtualized data centers, which adds extra data management practices.

SUMMARY

Examples provided herein are directed to colonization of transactional data based upon geography.

According to one aspect, an example computer system for colonizing transactions can include: one or more processors; and non-transitory computer-readable storage media encoding instructions which, when executed by the one or more processors, causes the computer system to: receive a transaction initiated by an originator; automatically route the transaction to a colony based upon a context packet associated with the transaction; and store data associated with the transaction in the colony; wherein the colony satisfies regulatory requirements of a geographic area associated with the transaction.

According to another aspect, an example method for colonizing transactions can include: receiving a transaction initiated by an originator; automatically routing the transaction to a colony based upon a context packet associated with the transaction; and storing data associated with the transaction in the colony, wherein the colony satisfies regulatory requirements of a geographic area associated with the transaction.

The details of one or more techniques are set forth in the accompanying drawings and the description below. Other features, objects, and advantages of these techniques will be apparent from the description, drawings, and claims.

DETAILED DESCRIPTION

This disclosure relates to the colonization of transactional data based upon geography.

Examples provided herein can include intelligent geo-tagged data segregation and data colonizing mechanisms that move data to a new localized data store to address multiple regulatory requirements. Such regulatory requirements can dictate various aspects of financial transactions, such as where the transactions can be executed and/or stored, data storage requirements such as types of data and preservation thereof, etc.

In some examples, an intelligent colonizer is provided that intelligently identifies transaction sets by various aspects of the transactions (e.g., originator/beneficiary/dates/contracts/regulatory periphery/etc.) and colonizes the data based upon geographical regulatory needs. The following example components can be included: (i) an intelligent utility to identify the changing regulatory needs and create data colony demands; and/or (ii) a plug-in which identifies the contextualized transactions and puts them in respective storage segments to manage them.

There can be various advantages associated with the technologies described herein. For instance, the intelligent colonization of data provides a more efficient way to categorize, store, and/or access transactional data while addressing regulatory issues. This allows for the easier geographic segregation of data according to various attributes of the data, such as originator, beneficiary, etc. In addition, these technologies can allow for the easier manipulation of the colonized data as changes are made to regulations, such as the combination of two or more colonies of data and/or the segregation of a colony into two or more colonies. Many other advantages are applicable based upon the technologies discussed herein.

Figure 1:
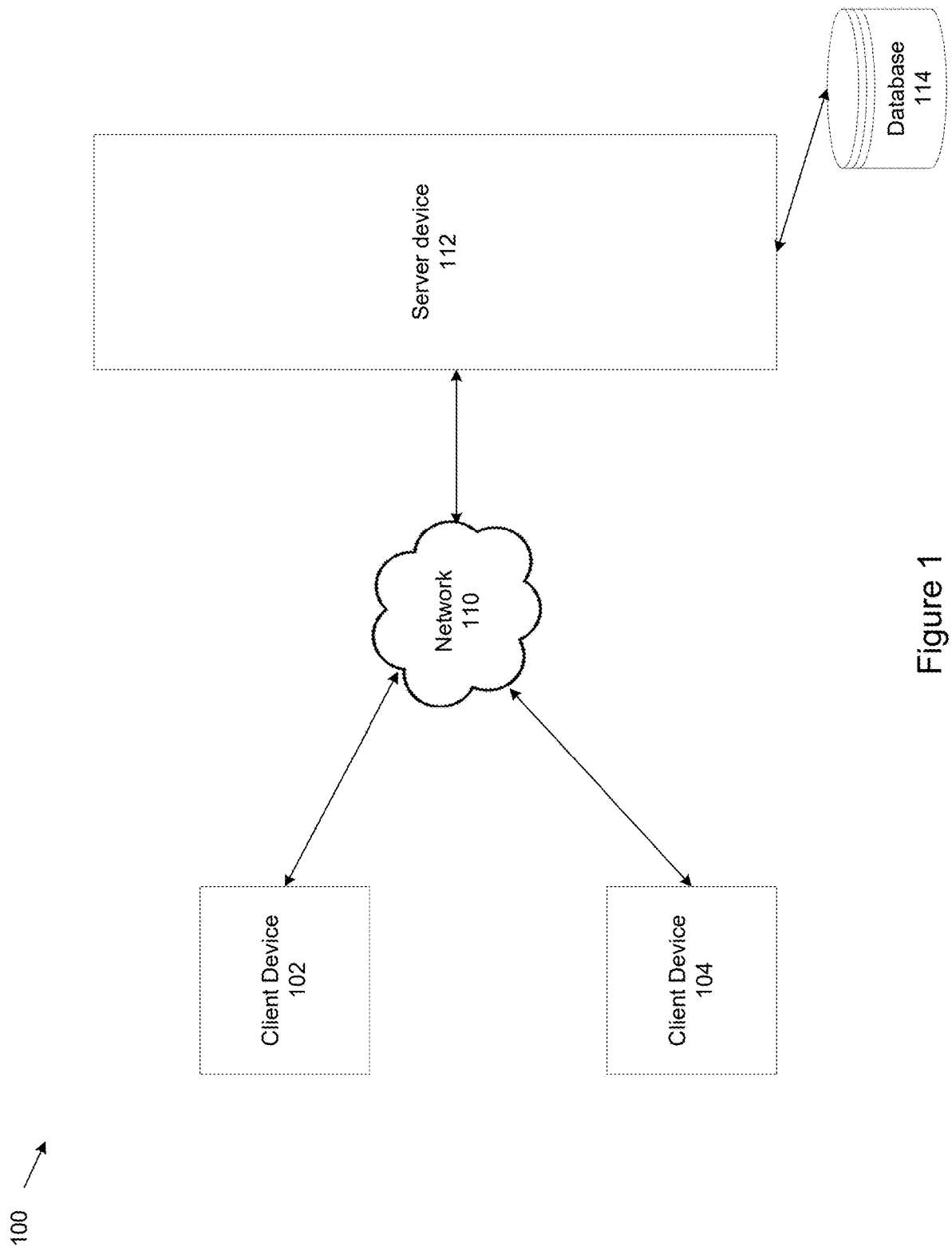
FIG. 1 shows an example system for colonizing transactional data based upon geography.

FIG. 1 schematically shows aspects of one example system 100 programmed to colonize transactional data based upon geography. In this example, the system 100 can be a computing environment that includes a plurality of client and server devices. In this instance, the system 100 includes client devices 102, 104, a server device 112, and a database 114. The client devices 102, 104 can communicate with the server device 112 through a network 110 to accomplish the functionality described herein.

Each of the devices may be implemented as one or more computing devices with at least one processor and memory. Example computing devices include a mobile computer, a desktop computer, a server computer, or other computing device or devices such as a server farm or cloud computing used to generate or receive data.

In some non-limiting examples, the server device 112 is owned by a financial institution, such as a bank. The client devices 102, 104 can be programmed to communicate with the server device 112 to accomplish financial transactions. Many other configurations are possible.

The example client devices 102, 104 are programmed to facilitate financial transactions. In one example, the client device 102 is the originator (payor) for a transaction. The client device 104 is the beneficiary (payee) for the transaction. Various mechanisms can be used to accommodate the transaction. Such mechanisms can include, without limitation: card transactions (e.g., credit/debit card payments); wire transfers; Automated Clearing House (ACH) payments; and/or application payments (e.g., Zelle, Venmo, WhatsApp).

The example server device 112 is programmed to facilitate the transaction between the client devices 102, 104. As provided in more detail below, the server device 112 is programmed to colonize transactional data associated with the transaction between the client devices 102, 104. This colonization can be performed based upon various aspects associated with the transaction, such as geographic considerations related to the location of the client device 102 and/or the client device 104. Many configurations are possible.

The example database 114 is programmed to store data associated with the transactions processed by the server device 112. In some examples, this data can include the aspects associated with the transaction. In the examples provided below, the database 114 can be broken into multiple databases or otherwise distributed geographically to address the colonization requirements for the system 100. See, e.g., FIG. 3.

The network 110 provides a wired and/or wireless connection between the client devices 102, 104 and the server device 112. In some examples, the network 110 can be a local area network, a wide area network, the Internet, or a mixture thereof. Many different communication protocols can be used. Although only three devices are shown, the system 100 can accommodate hundreds, thousands, or more of computing devices.

Figure 2:
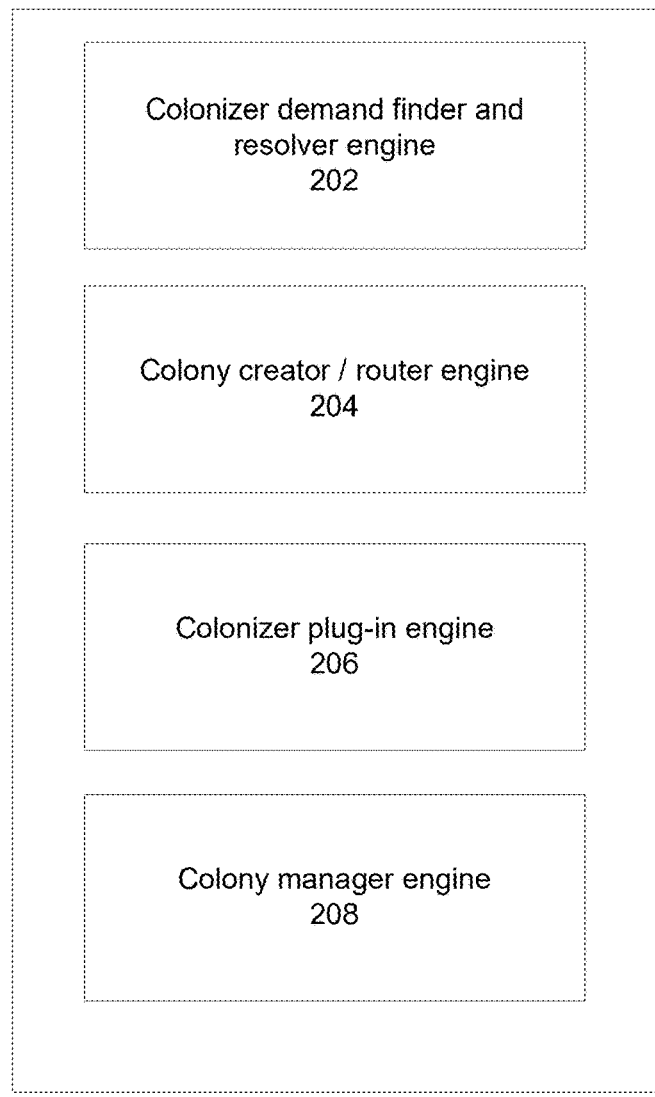
FIG. 2 shows example logical components of a server device of the system of FIG. 1.
Figure 3:
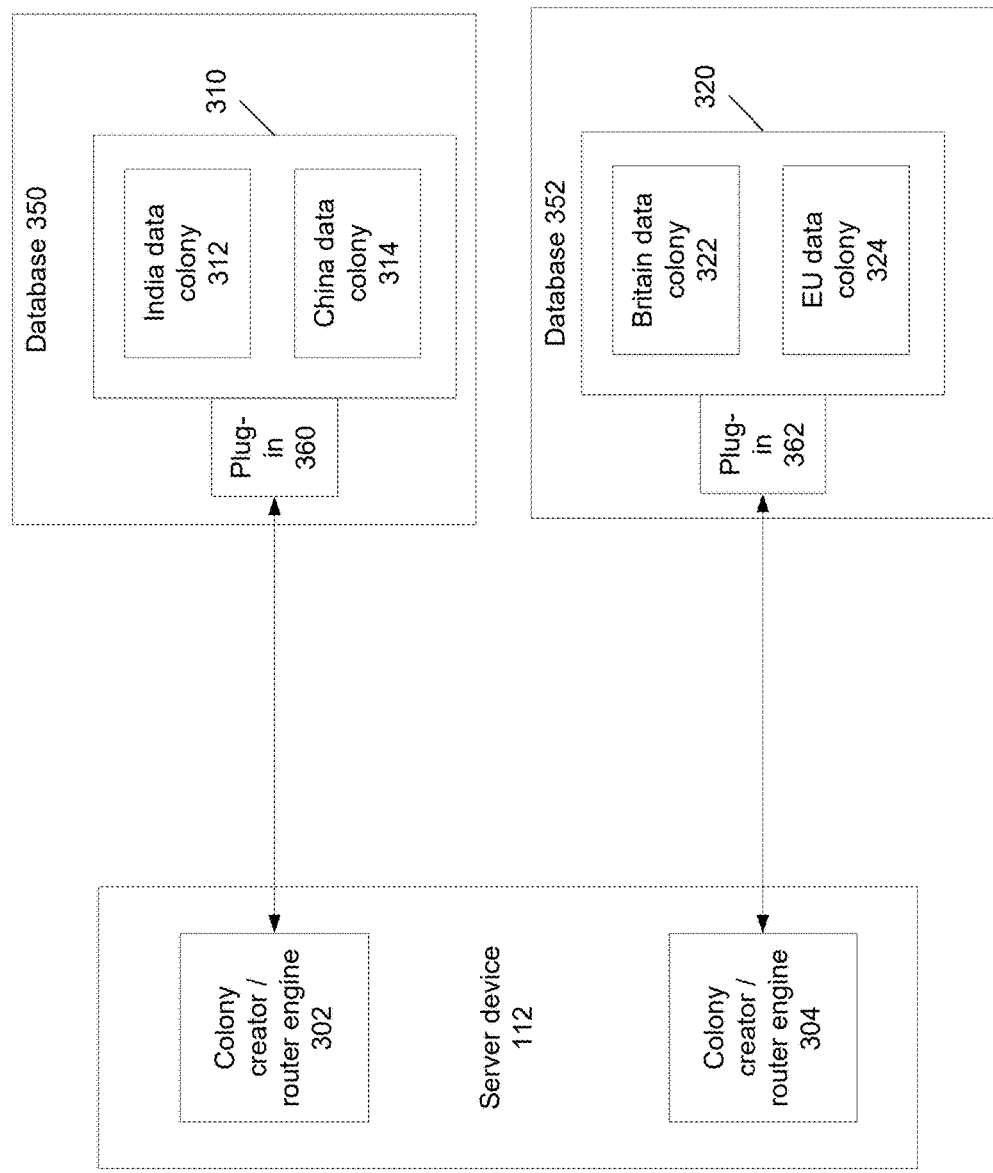
FIG. 3 shows additional details of the system of FIG. 1.

Referring now to FIGS. 2 and 3, additional details of the system 100, including the server device 112, are shown. In this example, the server device 112 has various logical modules that assist in the colonization of the transactional data. The server device 112 can, in this instance, include a colonizer demand finder and resolver engine 202, at least one colony creator/router engine 204, a colonizer plug-in engine 206, and a colony manager engine 208. In other examples, more or fewer engines providing different functionality can be used.

The example colonizer demand finder and resolver engine 202 is programmed to identify the changing regulatory needs and/or create data colonies based upon demand. For instance, in this example, the colonizer demand finder and resolver engine 202 is programmed to receive aspects associated with the transaction between the client device 102 and the client device 104. These aspects can include transactional data such as originator location, beneficiary location, etc. Based upon this transactional data, the colonizer demand finder and resolver engine 202 can determine which colony is on correct land to address originator localization requirements.

In one example, the transactional data associated with the transaction can include a context packet having such information as:
- location of originator—location of the originator of the transaction (e.g., the client device 102);
- location of the beneficiary-location of the beneficiary of the transaction (e.g., the client device 104);
- payment type—the type of payment, such as card, ACH, wire, application, etc.;
- point of sale-a geotagged location for the actual point of sale for the transaction (which can differ from the locations of the client devices 102, 104);
- type of transaction—the type of transaction, such as real-time or batch;
- type of payment—the type of payment, such as regular or high value; and/or
- on-us or off-us transaction-whether the transaction is handled by a single institution or is between institutions.

Based upon the context packet for the transaction, the colonizer demand finder and resolver engine 202 uses one or more models to determine whether a colony exists to store the transaction. The colonizer demand finder and resolver engine 202 thereupon communicates the transaction and instructions on whether to route the transaction to an existing colony and/or create a new colony to the colony creator/router engine 204.

The example colony creator/router engine 204 is programmed to route transactions to appropriate colonies based upon input from the colonizer demand finder and resolver engine 202. More specifically, the colony creator/router engine 204 monitors the demand for colonies of data for the system 100, creates and/or destroys colonies as necessary, and routes transactions to the appropriate colony.

For instance, for a transaction where there is an existing colony, the colony creator/router engine 204 is programmed to route the transaction to that appropriate colony. As illustrated in FIG. 3, the server device 112 can include multiple colony creator/router engines 302, 304 that handle different colonies for the system 100.

When the colonizer demand finder and resolver engine 202 determines that an existing colony is appropriate for a transaction having a particular context, the colony creator/router engines 302, 304 can route the transaction to the appropriate colony. In the example provided, assume the originator is located in India. The context packet indicates the origination in India, and the colonizer demand finder and resolver engine 202 routes the transaction to the colony creator/router engine 302.

The colony creator/router engines 302, 304, in turn, route the transaction to the appropriate colony within the database 114 associated with the system 100. In some examples, the database 114 can be broken or otherwise distributed across a geographic area or areas, such as the databases 350, 352 provided in FIG. 3. In the example, the databases 350, 352 are located in different geographic regions and provide different colonies, as described further below. The colony creator/router engines 302, 304 communicate with the colonizer plug-in engine 206 described below to store the data associated with the transaction in the appropriate colony.

Should the appropriate colony not exist on one or more of the databases 350, 352, the colony creator/router engines 302, 304 can be programmed to create the required new colony. This can include such aspects as: (i) identifying a proper geographic location for the new colony; (ii) identifying different transaction types to be stored within different data streets within a colony, which are segmented storage areas for different types of transactions within a colony.

Further, the colony creator/router engine 204 can be programmed to destruct one or more colonies should the regulatory environment change. For instance, a country may change its regulatory requirements such that transaction data is no longer required to be stored locally within a country. Upon such a regulatory change, the colony creator/router engine 204 is programmed to modify the colonies on the databases 350, 352 appropriately. For instance, the colony creator/router engine 204 may combine colonies so that data associated with transactions for that country are stored with other countries in a location that is more efficient and/or cheaper for processing and storage of transactions. This deprovisioning of a colony can result in significant advantages in efficiency and cost.

The example colonizer plug-in engine 206 is programmed to provide an interface between the colony creator/router engines 302, 304 and data colonies 310, 314, 322, 324 stored on the databases 350, 352. More specifically, a plug-in 360, 362 is provided for each colony 310, 320. The respective plug-in 360, 362 identifies the contextualized transactions and puts them in respective schemas/documents/tables within the respective colony 310, 320.

Each plug-in 360, 362 can be programmed to communicate with the databases 350, 352 according to the specific technology used. Examples of such technologies include Oracle, MongoDB, Database 2 (DB2), Google, and Amazon Web Services (AWS). For instance, the plug-in 360, 362 can be agnostic with respect to the type of transaction and the context packet associated therewith. The plug-in 360, 362 can identify the schema used for the context packet and the technology used by the database 350, 352 for storage of the colony 310, 320.

Further, the plug-in 360, 362 can be programmed to identify where within which colony 310, 320 the transaction should be stored. For instance, in this example, the colony 310 includes an India data colony 312 and a China data colony 314. Similarly, the colony 320 includes a Britain data colony 322 and an EU data colony 324. Each of these colonies 312, 314, 322, 324 is configured to satisfy certain regulatory requirements for a particular geography.

For instance, assume that the transaction described above includes the client device 102 (as originator) located in India. In this example, based upon the location of origination, the transaction is routed by the colony creator/router engine 302 to the plug-in 360. The plug-in 360, in turn, translates the data associated with the transaction for storage in the India data colony 312 within the database 350. The India data colony 312 is configured to satisfy India regulatory requirements for such transaction, such as storing the data within India for a particular period of time (e.g., 5 years).

In some examples, the plug-in 360 is further programmed to store the data within a specific data street within the India data colony 312. For instance, assume the example transaction is a card transaction between the client devices 102, 104. The plug-in 360 is programmed to store the data associated with the transaction within a data street associated with card transactions within the India data colony 312. Multiple data streets can be provided within a colony, such as being segmented by transaction type and/or divided or combined based upon data size, etc.

In these examples, the plug-ins 360, 362 can user various classification processes for selecting the appropriate database, colony, and data street for storage of transactional data. These classifications can be based upon the schema associated with the context packet for each transaction. The plug-ins 360, 362 can use comparative analytic models and libraries for classification to select the appropriate data street. Many configurations are possible.

The example colony manager engine 208 is programmed to manage the various components of the system 100. For instance, the colony manager engine 208 can crawl the various data colonies 310, 320 for the system 100 to orchestrate changes to accommodate regulations and/or increase efficiency.

For instance, the colony manager engine 208 can determine when a particular colony is too large and thereby divide the colony into smaller pieces. For instance, the colony manager engine 208 can determine how many data streets are associated with a colony and increase those data streets as necessary to accommodate increases in data while maintaining efficiency for the databases 350, 352.

Further, the colony manager engine 208 can be programmed to accommodate changes in the number of colonies and/or financial institutes associated with the colonies. For example, the colony manager engine 208 can be programmed to add a financial institution to one or more colonies to allow the new financial institution to participate in the advantages associated with the system 100. The colony manager engine 208 can segregate such data so that transactions for additional financial institutions can be added or removed from the system 100 as desired.

Figure 4:
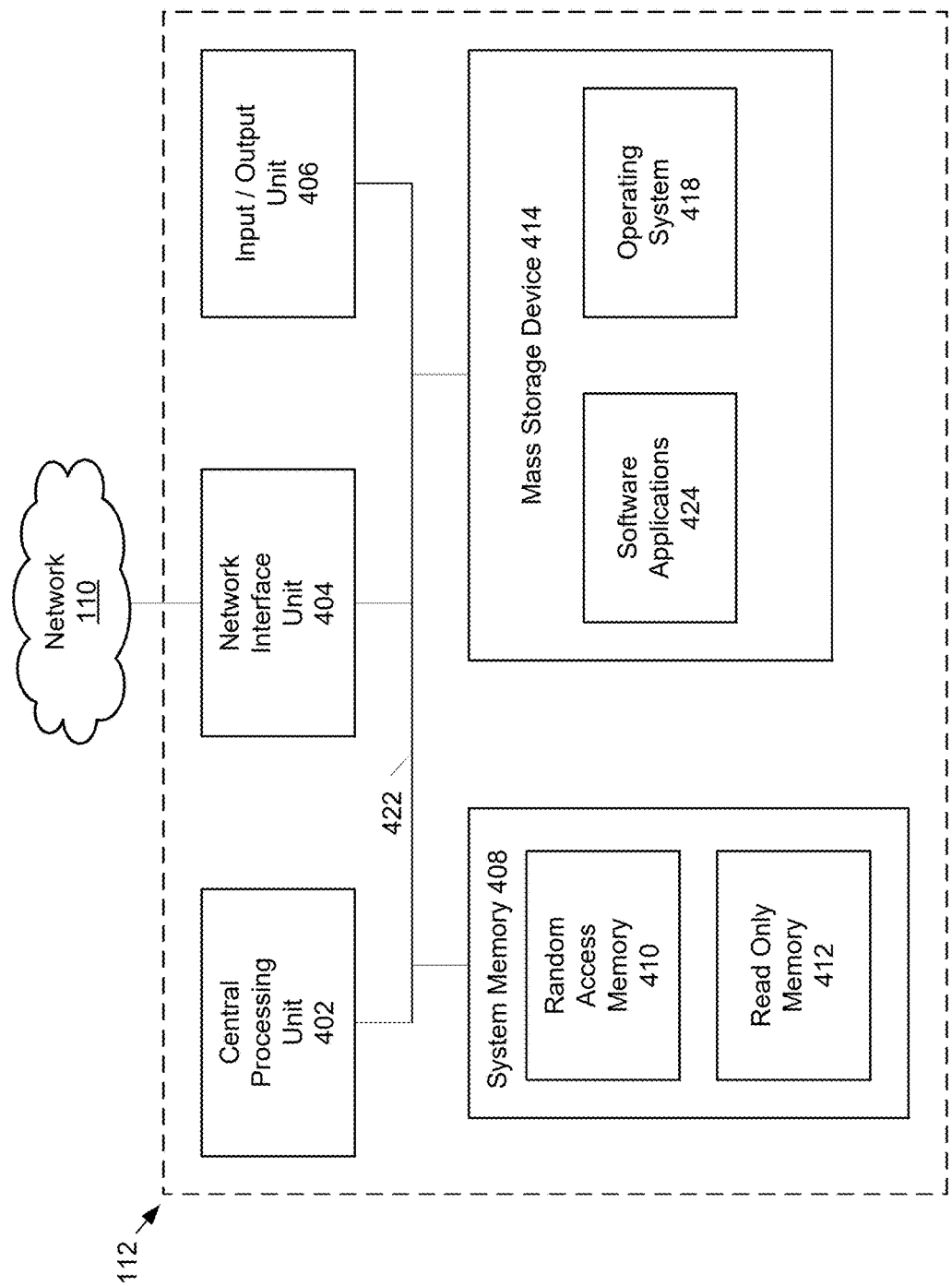
FIG. 4 shows example physical components of the server device of FIG. 2.

As illustrated in the embodiment of FIG. 4, the example server device 112, which provides the functionality described herein, can include at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system containing the basic routines that help transfer information between elements within the server device 112, such as during startup, is stored in the ROM 412. The server device 112 further includes a mass storage device 414. The mass storage device 414 can store software instructions and data. A central processing unit, system memory, and mass storage device similar to that shown can also be included in the other computing devices disclosed herein.

The mass storage device 414 is connected to the CPU 402 through a mass storage controller (not shown) connected to the system bus 422. The mass storage device 414 and its associated computer-readable data storage media provide non-volatile, non-transitory storage for the server device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 112.

According to various embodiments of the invention, the server device 112 may operate in a networked environment using logical connections to remote network devices through network 110, such as a wireless network, the Internet, or another type of network. The server device 112 may connect to network 110 through a network interface unit 404 connected to the system bus 422. It should be appreciated that the network interface unit 404 may also be utilized to connect to other types of networks and remote computing systems. The server device 112 also includes an input/output controller 406 for receiving and processing input from a number of other devices, including a touch user interface display screen or another type of input device. Similarly, the input/output controller 406 may provide output to a touch user interface display screen or other output devices.

As mentioned briefly above, the mass storage device 414 and the RAM 410 of the server device 112 can store software instructions and data. The software instructions include an operating system 418 suitable for controlling the operation of the server device 112. The mass storage device 414 and/or the RAM 410 also store software instructions and applications 424, that when executed by the CPU 402, cause the server device 112 to provide the functionality of the server device 112 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for colonizing transactions, comprising:
   one or more processors; and
   non-transitory computer-readable storage media encoding instructions which, when executed by the one or more processors, causes the computer system to:

receive a transaction having a transaction type initiated by an originator;

segment a colony stored within one or more databases into data streets, with the data streets being storage areas corresponding to different transaction types;

automatically route the transaction to a specific data street of the colony based upon a context packet associated with the transaction;

store data associated with the transaction in the specific data street of the colony;

crawl the colony within the one or more databases to determine an efficiency of the colony; and divide the colony into two or more new colonies when the colony is too large, based upon the data streets in the colony, to accommodate increases in data in the colony while maintaining the efficiency for the one or more databases;

wherein the colony satisfies regulatory requirements of a geographic area associated with the transaction, and wherein the specific data street corresponds to the transaction type of the transaction.

2. The computer system of claim 1, comprising further instructions which, when executed by the one or more processors, causes the computer system to:

generate multiple colonies at different geographic locations; and store the data associated with the transaction in one of the multiple colonies.

3. The computer system of claim 1, comprising further instructions which, when executed by the one or more processors, causes the computer system to generate a new colony when the regulatory requirements change.

4. The computer system of claim 1, comprising further instructions which, when executed by the one or more processors, causes the computer system to destruct the colony when the regulatory requirements change.

5. The computer system of claim 1, wherein the context packet includes a location of the originator.

6. The computer system of claim 5, wherein the geographic area is the location of the originator.

7. The computer system of claim 1, comprising further instructions which, when executed by the one or more processors, causes the computer system to identify a type and a location of the transaction from the context packet.

8. The computer system of claim 7, wherein the type and the location of the transaction are used to select a data street within the colony.

9. A method for colonizing transactions, comprising:

receiving a transaction having a transaction type initiated by an originator;

segmenting a colony stored within one or more databases into data streets, with the data streets being storage areas corresponding to different transaction types;

automatically routing the transaction to a specific data street of the colony based upon a context packet associated with the transaction;

storing data associated with the transaction in the colony;

crawling the colony within the one or more databases to determine an efficiency of the colony; and dividing the colony into two or more new colonies when the colony is too large, based upon the data streets in the colony, to accommodate increases in data in the colony while maintaining the efficiency for the one or more databases;

wherein the colony satisfies regulatory requirements of a geographic area associated with the transaction; and wherein the specific data street corresponds to the transaction type of the transaction.

10. The method of claim 9, further comprising:

generating multiple colonies at different geographic locations; and storing the data associated with the transaction in one of the multiple colonies.

11. The method of claim 9, further comprising generating a new colony when the regulatory requirements change.

12. The method of claim 9, further comprising destructing the colony when the regulatory requirements change.

13. The method of claim 9, wherein the context packet includes a location of the originator.

14. The method of claim 13, wherein the geographic area is the location of the originator.

15. The method of claim 9, further comprising identifying a type and a location of the transaction from the context packet.

16. The method of claim 15, wherein the type and the location of the transaction are used to select a data street within the colony.

* * * * *